(12) United States Patent  (10) Patent No.: US 9,413,003 B2
Sawai et al.  (45) Date of Patent: Aug. 9, 2016

(54) ELECTRODE MATERIAL FOR LITHIUM SECONDARY BATTERY AND LITHIUM SECONDARY BATTERY

(75) Inventors: Takehiko Sawai, Mie (JP); Shinji Saito, Mie (JP); Kazunori Urao, Mie (JP); Takashi Kawasaki, Tokyo (JP)

(73) Assignees: SEI CORPORATION, Mie (JP); DENKA COMPANY LIMITED, Tokyo (JP)

( * ) Notice: Subject to any disclaimer, the term of this patent is extended or adjusted under 35 U.S.C. 154(b) by 198 days.

(21) Appl. No.: 13/574,996

(22) PCT Filed: Jul. 7, 2011

(86) PCT No.: PCT/JP2011/065590
§ 371 (c)(1),
(2), (4) Date: Jul. 24, 2012

(87) PCT Pub. No.: WO2012/140790
PCT Pub. Date: Oct. 18, 2012

(65) Prior Publication Data
US 2012/0328923 A1  Dec. 27, 2012

(30) Foreign Application Priority Data
Apr. 13, 2011  (JP) .................................. 2011-089544

(51) Int. Cl.
*H01M 4/583* (2010.01)
*H01M 4/00* (2006.01)
(Continued)

(52) U.S. Cl.
CPC ................ *H01M 4/483* (2013.01); *H01M 4/13* (2013.01); *H01M 4/38* (2013.01); *H01M 4/5825* (2013.01);
(Continued)

(58) Field of Classification Search
None
See application file for complete search history.

(56) References Cited

U.S. PATENT DOCUMENTS 5,766,791 A * 6/1998 Takahashi et al. .............. 429/57
2004/0033360 A1   2/2004 Armand et al.
(Continued)

FOREIGN PATENT DOCUMENTS

AU   9356801 A   4/2002
AU   9356901 A   4/2002
(Continued)

OTHER PUBLICATIONS

Liang et al., "Graphene-based electrode materials for rechargeable lithium batteries," Published 2009, Journal of Materials Chemistry, 19, pp. 5871-5878.*
(Continued)

*Primary Examiner* — Ula C Ruddock
*Assistant Examiner* — Matthew Van Oudenaren
(74) *Attorney, Agent, or Firm* — Hedman & Costigan, P.C.; James V. Costigan; Kathleen A. Costigan

(57) ABSTRACT

The present invention provides a negative-electrode material for a lithium secondary battery which has a very low resistance, allows the lithium secondary battery to be charged and discharged (high output) at a high current and have a high capacity, and achieve a cycle life to such an extent that the lithium secondary battery can be mounted on a vehicle. The electrode material is composed of (a) at least one active substance (4) selected from among a metal oxide containing metal therein and an alloy material each of which is coated with a carbon material and has a graphene phase or an amorphous phase (8) on at least a surface thereof, (b) a graphite-based carbon material (5) having the graphene phase or the amorphous phase on at least a surface thereof; and (c) carbon material (6) other than the graphite-based carbon material and having the graphene phase or the amorphous phase on at least a surface thereof. The active substance (4), the graphite-based carbon material (5), and the carbon material (6) other than the graphite-based carbon material fuse the graphene phase or the amorphous phase (8a, 8b) thereof together and bond them to each other to form a composite active substance (7) including composed of the active substance including one active substance selected from among the metal oxide containing the metal and the alloy material.

22 Claims, 2 Drawing Sheets

(51) Int. Cl.
*H01M 4/48* (2010.01)
*H01M 4/13* (2010.01)
*H01M 4/58* (2010.01)
*H01M 4/62* (2006.01)
*H01M 4/587* (2010.01)
*H01M 4/36* (2006.01)
*H01M 4/38* (2006.01)
*H01M 4/1393* (2010.01)
*H01M 4/131* (2010.01)
*H01M 4/1391* (2010.01)
*H01M 4/139* (2010.01)
*H01M 4/1395* (2010.01)
*H01M 4/133* (2010.01)
*H01M 4/134* (2010.01)
*H01M 10/052* (2010.01)

(52) U.S. Cl.
CPC ............. *H01M 4/625* (2013.01); *H01M 4/131* (2013.01); *H01M 4/133* (2013.01); *H01M 4/134* (2013.01); *H01M 4/139* (2013.01); *H01M 4/1391* (2013.01); *H01M 4/1393* (2013.01); *H01M 4/1395* (2013.01); *H01M 4/36* (2013.01); *H01M 4/366* (2013.01); *H01M 4/386* (2013.01); *H01M 4/387* (2013.01); *H01M 4/48* (2013.01); *H01M 4/583* (2013.01); *H01M 4/587* (2013.01); *H01M 10/052* (2013.01); *Y02E 60/122* (2013.01)

(56) References Cited

U.S. PATENT DOCUMENTS

| | | | |
|---|---|---|---|
| 2004/0086445 | A1 | 5/2004 | Armand et al. |
| 2004/0106040 | A1* | 6/2004 | Fukuoka et al. ............... 429/212 |
| 2005/0074672 | A1* | 4/2005 | Matsubara et al. ....... 429/231.95 |
| 2005/0136330 | A1 | 6/2005 | Mao et al. |
| 2005/0153205 | A1* | 7/2005 | Hisashi ................. H01M 4/131 429/232 |
| 2005/0214644 | A1 | 9/2005 | Aramata et al. |
| 2006/0127773 | A1* | 6/2006 | Kawakami et al. ........... 429/245 |
| 2007/0077490 | A1 | 4/2007 | Kim et al. |
| 2007/0134554 | A1 | 6/2007 | Armand et al. |
| 2008/0166634 | A1* | 7/2008 | Kim et al. .................. 429/218.1 |
| 2009/0130562 | A1 | 5/2009 | Mao et al. |
| 2009/0142668 | A1* | 6/2009 | Ishii ............................ 429/231.8 |
| 2009/0252864 | A1 | 10/2009 | Carel et al. |
| 2010/0065787 | A1 | 3/2010 | Armand et al. |
| 2010/0086855 | A1 | 4/2010 | Kohmoto et al. |
| 2010/0178563 | A1* | 7/2010 | Ozaki et al. ................. 429/231.8 |
| 2010/0310939 | A1 | 12/2010 | Yoshida |
| 2011/0136007 | A1* | 6/2011 | Zhamu et al. ................. 429/209 |
| 2012/0058397 | A1* | 3/2012 | Zhamu et al. .............. 429/231.8 |

FOREIGN PATENT DOCUMENTS

| | | |
|---|---|---|
| CA | 2320661 A1 | 3/2002 |
| CA | 2422446 A | 4/2002 |
| CA | 2423129 A | 4/2002 |
| CA | 2548988 A | 7/2005 |
| CN | 1478310 A | 2/2004 |
| CN | 1674325 A | 9/2005 |
| CN | 1894811 A | 1/2007 |
| CN | 101359734 A | 1/2007 |
| CN | 1937288 A | 3/2007 |
| CN | 101447586 A | 3/2009 |
| CN | 101453020 A | 10/2009 |
| CN | 101933191 A | 12/2010 |
| EP | 1325525 A | 7/2003 |
| EP | 1325526 A | 7/2003 |
| EP | 1 702 375 A | 9/2006 |
| EP | 2 065 887 A1 | 10/2009 |
| EP | 2 192 640 A1 | 11/2009 |
| JP | 2004-063411 A | 2/2004 |
| JP | 2004-509058 A | 3/2004 |
| JP | 2004-509447 A | 3/2004 |
| JP | 2004-303496 A | 10/2004 |
| JP | 2005-310759 A | 4/2005 |
| JP | 2007-087956 A | 4/2007 |
| JP | 2007-519182 A | 7/2007 |
| JP | 2008-277128 A | 11/2008 |
| JP | 2009-152188 A | 7/2009 |
| JP | 2009-187676 A | 8/2009 |
| JP | 2009-277661 A | 11/2009 |
| JP | 2010-092599 A | 4/2010 |
| JP | 2011-018575 A | 1/2011 |
| KR | 10-2003-0045791 A | 6/2003 |
| KR | 10-2006-0044724 A | 5/2006 |
| KR | 10-2006-0111588 A | 10/2006 |
| KR | 10-0745733 B | 7/2007 |
| KR | 10-2009-0056884 A | 3/2009 |
| KR | 10-2010-010996 A | 9/2010 |
| WO | 2002-027823 A1 | 4/2002 |
| WO | 2002-027824 A1 | 4/2002 |
| WO | 2005/065082 A2 | 7/2005 |
| WO | 2009-095782 A1 | 8/2009 |

OTHER PUBLICATIONS

Wang et al., "Electrochemical properties of carbon coated LiFePO4 cathode materials," Available online Jun. 13, 2005, Journal of Power Souces, 146, pp. 521-524.*

Takahiro Morishita et al., "Preparation of carbon-coated Sn powders and their loading onto graphite flakes for lithium ion secondary battery", Journal of Power Sources, Sep. 29, 2006, vol. 190, No. 1, pp. 638-644.

Yong-Sheng Hu, et al.; Angew Chem., vol. 120, 2008, pp. 1669-1673.

Liwei Su, Zhen Zhou and Manman Ren: Chem. Commun., vol. 46, Feb. 5, 2010, pp. 2590-2592.

Xuyang Wang, Xufeng Zhou et al.: Carbon. vol. 49, Sep. 7, 2010, pp. 133-139.

Hongfa Xiang, Kai Zhang et al.: Carbon: vol. 49, Jan. 9, 2011, pp. 1787-1796.

ACS Applied Materials & Interfaces, vol. 2, Nov. 29, 2010, pp. 3709-3713.

Supplementary European Search Report, in corresponding application, dated Aug. 7, 2014.

Yong-Sheng Hu et al.; Superior Storage Performance of a Si@SiOx/C Nanocomposite as Anode Material for Lithium-Ion Batteries; Angewandte Chemie International Edition, vol. 47, No. 9, pp. 1645-1649 (Feb. 15, 2008).

Xiao-Liang Wang et al., Sn/SnOx Core-Shell Nanospheres; Synthesis, Anode Performance in Li Ion Batteries, and Superconductivity, Journal of Physical Chemistry C, vol. 114, No. 35, pp. 14697-14703 (Aug. 13, 2010).

* cited by examiner

ELECTRODE MATERIAL FOR LITHIUM SECONDARY BATTERY AND LITHIUM SECONDARY BATTERY

TECHNICAL FIELD

The present invention relates to an electrode material of a lithium secondary battery and the lithium secondary battery using the electrode material.

BACKGROUND ART

The lithium secondary battery in which a negative electrode is formed by using a material capable of absorbing and discharging lithium ions is capable of restraining deposit of dendrite to a higher extent than a lithium secondary battery in which the negative electrode is formed by using metallic lithium. Therefore the lithium secondary battery has been supplied to the market as a secondary battery having enhanced safety.

In recent years, the development of the lithium secondary battery is advanced to mount it on a vehicle. It is a big problem to improve the performances of the lithium secondary battery so that it can be charged and discharged at a high current and has a high capacity and a long life, even though it is repeatingly charged and discharged.

To overcome this problem, efforts have been made to improve the performance of the lithium secondary battery. Not only a positive-electrode material composed of lithium metal oxide, but also a positive-electrode material containing insulating oxide and a positive-electrode material having a high resistance have been investigated. Investigations have been made on negative-electrodes composed of materials such as a carbon-based material, a material containing titanium oxide, and an alloy-based material which have a high capacity and through which a high current can be flowed.

Efforts have been made to decrease the current density load of the lithium secondary battery by increasing the specific surface area of active substance particles composing the positive-electrode and negative-electrode materials such that the diameter thereof are decreased and by so designing electrodes as to increase the area of the electrodes.

The above-described devices have improved the performance of the lithium secondary battery in allowing the lithium secondary battery to have a high capacity and be charged and discharged at a high current, but were insufficient as a measure for prolonging the life of the lithium secondary battery. Therefore the substitution mixing ratio of metal elements of lithium metal oxides used to form the positive electrode and substitution of doped metals have been investigated. There has been proposed an additive devised to prevent a resistant film from being generated by the decomposition of an electrolyte at the negative electrode composed of a carbon-based material. To improve the performance of a negative electrode composed of an alloy-based material having a semiconductor property, there has been also proposed an alloy composition, the addition of a conductive material, and a binding agent devised to restrain the volume expansion of an alloy. For example, the electrode for a secondary battery composed of the electrode material containing the active substance powder, the conductive material which is formed from the carbon material and attaches to the surface of the active substance powder, and the fibrous conductive material combined with the conductive material is known (patent document 1).

Although the above-described proposed means are capable of increasing the cycle life up to 3000 to 4000 cycle level from hundreds of cycles, the means are insufficient for increasing the cycle life not less than 5000 cycles for not less than 10 years. Thus batteries having the electrodes proposed as described above do not have performance to such an extent that they can be mounted on a vehicle. In the proposal of relaxing the volume expansion of the alloy to increase the adhesive force of the binding agent by using polyimide as the binding agent of the negative electrode composed of the alloy, there is an increase in the use amount of the binding agent when it is used as the technique of making the alloy active substance fine and preventing the alloy active substance from separating from the electricity collection foil, a designed capacity is not satisfied, and the cost increases. Thus it is difficult for the proposed means to satisfy the demanded performance to such an extent that batteries having the electrodes can be mounted on a vehicle.

It is difficult for the above-described proposed means to increase the capacity and output and improve the life of the batteries using the lithium metal oxide having a high electric resistance for the positive electrode, the titanium oxide having the insulating and semiconductor property for the negative electrode, the alloy for the negative electrode, and the carbon-based material having conductivity but a high contact resistance because of particles made fine.

PRIOR ART DOCUMENT

Patent Document

Patent document 1: Japanese Patent Application Laid-Open No. 2008-277128

SUMMARY OF THE INVENTION

Problem to be Solved by the Invention

The present invention has been made to solve the above-described problems. It is an object of the present invention to provide an electrode material for a lithium secondary battery which has a very low resistance, allows the lithium secondary battery to be charged and discharged (high output) at a high current and have a high capacity, and achieve a cycle life to such an extent that the lithium secondary battery can be mounted on a vehicle. It is also an object of the present invention to provide the lithium secondary battery using the electrode material.

Means for Solving the Problem

An electrode material for a lithium secondary battery which repeatingly absorbs and discharges lithium ions by immersing or penetrating an organic electrolyte into a group of electrodes, the electrodes are wound or layered one upon another between a positive-electrode material in contact with a positive-electrode plate and a negative-electrode material in contact with a negative-electrode plate through an intermediary of a separator.

The negative-electrode material contains a component (a), a component (b), and a component (c). Each of the components (a), (b), and (c) has at least one phase (hereinafter referred to as graphene phase and/or the like) selected from among a graphene phase and an amorphous phase as a surface phase. The negative-electrode material contains a composite negative-electrode active substance obtained by fusing the surface phases together and bonding the surface phases to each other. The graphene phase means one layer of a plain six-membered ring structure of $sp^2$-bonded carbon atoms.

The amorphous layer means a three-dimensional six-membered ring structure. That the surface phases are fused together and bonded to each other means that the carbon atoms are bonded to each other owing to turbulence of the graphene phase and/or the amorphous phase.

The component (a) is at least one active substance selected from among a metal oxide containing metal and an alloy material each of which is coated with a carbon material and has at least one phase selected from among the graphene phase and/or the like on at least a surface thereof.

The component (b) is a graphite-based carbon material having the graphene phase and/or the like on at least a surface thereof.

The component (c) is a carbon material other than the graphite-based carbon material and has the graphene phase and/or the like on at least a surface thereof.

The active substance is a powder of tin oxide including metal tin therein or a powder of silicon oxide including metal silicon therein.

The negative-electrode material contains a composite positive-electrode active substance obtained by fusing the surface phases formed on a surface of a component (d) and that of a component (e) shown below together and bonding the surface phases to each other.

The component (d) is Olivine-type lithium metal phosphate coated with a carbon material and has the graphene phase and/or the like on at least a surface thereof.

The component (e) is a carbon material other than the graphite carbon material and has the graphene phase and/or the like on at least a surface thereof.

The graphite-based carbon material is at least one carbon material selected from among artificial graphite, natural graphite, easy graphitized carbon material, and an amorphous carbon material.

The component (c) or (e) is at least one selected from among acetylene black, Ketjen black, a powder containing graphite crystal, and conductive carbon fiber.

The conductive carbon fiber is at least one fiber selected from among carbon fiber, graphite fiber, vapor-phase growth carbon fiber, carbon nanofiber, and carbon nanotube.

In a lithium secondary battery of the present invention which repeatingly absorbs and discharges lithium ions by immersing or penetrating an organic electrolyte into a group of electrodes, the electrodes are wound or layered one upon another between a positive-electrode material in contact with a positive-electrode plate and a negative-electrode material in contact with a negative-electrode plate through an intermediary of a separator, the positive-electrode material is the positive-electrode material of the present invention or the negative-electrode material is the negative-electrode material of the present invention. That is, the positive-electrode material and the negative-electrode material are the electrode materials for the lithium secondary battery of the present invention.

Effect of the Invention

In the electrode material for the lithium secondary battery of the present invention, the positive-electrode material contains the Olivine-type lithium metal phosphate having the graphene phase and/or the like on its surface. The negative-electrode material contains the metal oxide containing the metal or the alloy material having the graphene phase on its surface. The above-described components of the electrode materials are bonded to the carbon materials at the interface between the components and the carbon materials through the intermediary of the graphene phase and/or the like present on the surfaces thereof. Therefore the resistance between powders is lower than the resistance generated in contact electric conduction which occurs in mixed powders composing the electrodes. Consequently the lithium secondary battery in which these components are used as the electrodes has the following performances: (a) The electrodes of the lithium secondary battery is charged and discharged at a higher current than electrodes in which mixed powders contact each other. (b) Owing to the improvement of the utilization ratio of the active substance, the lithium secondary battery has a high capacity. (c) There is no change in the conductive property in spite of expansion and contraction caused by charge-discharge cycles. (e) Because the different kinds of the carbon materials are present on the surfaces of the powders of the positive and negative electrodes, a resistance film is not generated by the decomposition of the electrolyte. Therefore there is little increase in the resistance when the lithium secondary battery is charged and discharged, and thus the lithium secondary battery is allowed to have a long life.

In the negative-electrode material, the silicon oxide containing the metal silicon or the tin oxide containing the metal tin is coated with the carbon material having the graphene phase and/or the like, and the graphite-based carbon material and the graphene phase and/or the like are bonded to each other with the carbon atoms. Therefore the powder of the active substance of the negative electrode is surrounded with the graphene phases and/or the like fused together. As a result, a firm bonding between the carbon materials improves a serious problem that the silicon-based or tin-based negative electrode has a short life owing to its volume expansion.

Of the active substances of the positive and negative electrodes, the Olivine-type lithium metal phosphate and a lithium-containing metal silicate compound each having a comparatively high resistance, a titanate compound known as an insulator, and metal oxide powder of the negative electrode are coated with the carbon material having the graphene phase and/or the like. These graphene phases and/or the like and the graphene phase and/or the like of the conductive carbon material are fused together. Consequently in the present invention, there does not occur contact electric conduction which occurs in lithium metal oxide to be used as an active substance for the positive electrode and a carbon-based active substance for the negative electrode each having a comparatively a high conductivity respectively. In addition, from the standpoint of the formation of an electronic network, because the surface of the active substance is coated with the carbon material, it is considered that an electronic energy distribution of atoms composing a powder having properties close to an insulator and a powder having semiconductor properties has an effect of attracting electrons to a valence electron band in which the atoms are allowed to display conductive properties from carbon atoms composing the carbon material and changing the electronic energy distribution of the atoms composing the above-described powders to an electron distribution of a conductive substance. Further a conductive material bonded to the carbon material present on the surface of the active substance so operates as to secure the electrolyte and has an effect of developing a capacity when the lithium secondary battery is charged and discharged at a high current.

MODE FOR CARRYING OUT THE INVENTION

Figure 1:
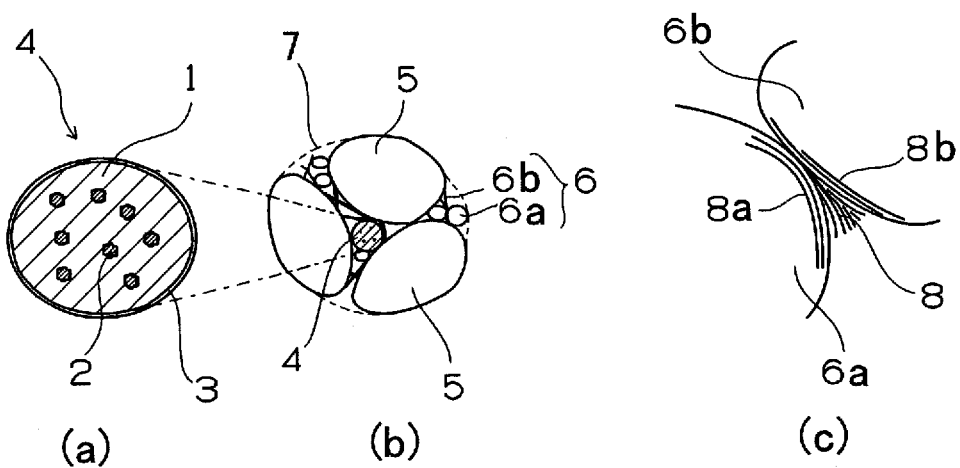
FIG. 1 is a pattern diagram of a negative-electrode material formed by compositing Si—$SiO_2$ and a carbon-based conductive material as an example of the present invention.
Figure 2:
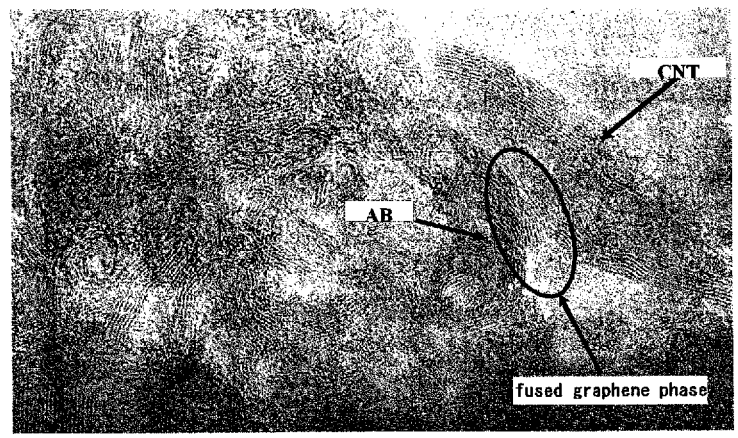
FIG. 2 is a photograph, taken by a transmission-type electron microscope, which shows a state in which the graphene phase and/or the like are fused together.

FIG. 1 shows a pattern diagram of a negative-electrode material formed by compositing Si—SiO$_2$ which is an active substance and a carbon-based conductive material as an example of an electrode material for the lithium secondary battery of the present invention. FIG. 1(a) shows Si—SiO$_2$ which is the active substance coated with a graphene phase. FIG. 1(b) shows a composite active substance consisting of a carbon material which is a carbon-based main material of the negative electrode, the active substance shown in FIG. 1(a), and the carbon-based conductive material. FIG. 1(C) shows a state in which the graphene phase and/or the like are fused together and bonded to each other. FIG. 2 is a photograph, taken by the transmission-type electron microscope, which shows a state in which the graphene phase and/or the like are fused together.

As shown in FIG. 1(a), in an active substance 4 capable of absorbing and discharging lithium ions, the surface of a powder (average particle diameter: 100 to 500 nm) composed of an oxide (SiO—SiO$_2$) 1 and a metal silicon 2 included therein is coated with a carbon material 3 having a thickness of several nanometers. The surface of the carbon material 3 is composed of the graphene phase and/or the like.

By mixing the active substance 4 coated with the carbon material 3 with a graphite-based carbon material 5 such as graphite, and a carbon material 6 such as acetylene black 6a and carbon nanotube 6b other than the graphite-based carbon material and calcining the mixture, the graphene phases and/or the like present on the carbon materials overlap each other and fuse together. At the same time, the active substance 4 is surrounded with the graphite-based carbon material 5 to form a composite active substance 7 including the active substance therein. The average particle diameter of the composite active substance 7 is 3 to 10 μm and preferably 3 to 7 μm.

As shown in FIG. 1(C), a graphene phase 8a present on the surface of the acetylene black 6a and a graphene phase 8b present on the surface of the carbon nanotube 6b overlap each other and fuse together to form a fused phase 8 consisting of the graphene phase and/or the like.

As shown in FIG. 2, the graphene phases fuse together on the surfaces of the carbon materials. The electrical conduction property is improved by overlapping the graphene phases each other and fusing them together. In FIG. 2, AB and CNT denote the acetylene black and the carbon nanotube respectively. The magnification is 3.2 million times.

Volume expansion of SiO—SiO$_2$ which is the oxide can be relaxed by a cushioning performance generated by bonding between SiO—SiO$_2$ and the graphite-based carbon material 5 as well as the carbon material 6 other than the graphite-based carbon material 5 with SiO—SiO$_2$ being surrounded with the graphite-based carbon material 5 and the carbon material 6. That is, even though the volume of the active substance 4 expands, it is possible to suppress the volume expansion of the composite active substance 7 as a whole. Thereby the life of the lithium secondary battery is improved.

The negative electrode for the lithium secondary battery is constructed of the composite active substance 7 and a binding material.

As materials, for the negative-electrode material 4 capable of absorbing and discharging the lithium ions, which form the composite active substance 7, it is possible to list the carbon material, a lithium-aluminum alloy, a silicon-based or tin-based lithium alloy, mixtures of oxides of these alloys, lithium titanate, and mixtures of the above-described materials.

Of the above-described materials, it is preferable to use the carbon material because it has a small irreversible capacity. In recent years, the lithium titanate, silicon oxide or tin oxide, and a mixture of silicon metals or tin metals have come to be used as high-capacity materials.

In the present invention, it is considered that the use of metal oxides containing a metal and alloy materials containing a metal brings about a high effect. As examples of the above-described metal oxides and alloy materials, a mixture of the lithium titanate, the tin metal or the silicon metal, and tin metal oxide or silicon metal oxide are exemplified.

In the present invention, to solve a short life of the tin-based material or the silicon-based material of the negative electrode, it is preferable to form the negative-electrode material 4 by disposing the carbon material having the graphene phase and/or the like on its surface on powders of the tin oxide including the tin metal or the silicon oxide including the silicon metal.

As the active substance of the positive-electrode material for the lithium secondary battery, layered or spinel-shaped lithium-containing metal oxides, solid solutions thereof, lithium-containing metal phosphate compounds, lithium-containing metal silicate compounds, and fluorides thereof are listed. Of these active substances, the lithium-containing metal phosphate compound is preferable. The Olivine-type lithium metal phosphate is especially suitable for achieving the object of the present invention. The positive-electrode material for the lithium secondary battery is constructed of the olivine-type lithium metal phosphate serving as its main material and the binding material.

As the layered or spinel-shaped lithium-containing metal oxides, LiCoO$_2$, Li(Ni/Co/Mn)O$_2$, and LiMn$_2$O$_4$ are listed. As the solid solutions, Li$_2$MnO$_3$—LiMO$_2$ (M=Ni, Co, Mn) is exemplified. As the lithium-containing metal phosphate compound, LiFePO$_4$, LiCoPO$_4$, and LiMnPO$_4$ are listed. As the silicate compounds, LiFeSiO$_4$ is exemplified. As the fluorides, Li$_2$FePO$_4$.F is exemplified. As the lithium-containing compounds, LiTi$_2$(PO$_4$)$_3$ and LiFeO$_2$ are exemplified.

Of these active substances of the positive-electrode material, it is preferable to use LiFePO$_4$ which is the Olivine-type lithium metal phosphate of the lithium-containing metal phosphate compound.

As the carbon material, which can be used in the present invention, to coat the surface of the positive-electrode or negative-electrode active substance, it is possible to select a crystalline system carbon material or an amorphous system carbon material. The amorphous carbon material is more favorable.

The surface of the positive-electrode or negative-electrode active substance can be easily coated with the carbon material by treating the positive-electrode or negative-electrode active substance with a gas or a liquid containing carbon hydride and thereafter calcining the treated positive-electrode or negative-electrode active substance in a reducing atmosphere.

The carbon material coating the surface of the positive-electrode or negative-electrode active substance is in close contact with the surface thereof. The graphene phase and/or the like are formed on the surface of the carbon material. The graphene phase and/or the like can be formed by calcining the carbon material in the reducing atmosphere. The thickness of the coating layer of the carbon material is set to 1 to 10 nm and preferably 2 to 5 nm. When the thickness of the coating layer of the carbon material is out of the above-described range, namely, more than 10 nm, the coating layer of the carbon material is thick and thus the diffusion of lithium ions to the surface of the active substance which is the reaction portion of the battery deteriorates. As a result, a high-output property of the battery deteriorates.

As the graphite-based carbon material composing the negative electrode which can be used in the present invention, it is possible to use a carbon material, so-called soft carbon which allows a hexagonal net plane constructed of carbon atoms, a so-called graphite structure having the graphene phases layered one upon another with regularity to be easily developed on the surface thereof when the carbon material is heat-treated in the reducing atmosphere.

The average particle diameter of the graphite-based carbon material composing the negative electrode is set to preferably 5 to 10 μm. The mixing ratio of the graphite-based carbon material to the entire material composing the negative electrode is set to 60 to 95 mass % and preferably 70 to 80 mass %.

It is preferable that the carbon material, other than the graphite-based carbon material, which can be used in the present invention and has the graphene phase and/or the like on at least its surface is at least one selected from among conductive carbon powder and conductive carbon fiber.

It is preferable that the conductive carbon powder is at least one selected from among a powder including the acetylene black, a powder including ketjen black, and a powder including graphite crystal.

As the carbon fiber, the conductive carbon fiber is used. For example, it is favorable that the carbon material which can be used in the present invention contains at least one kind selected from among the carbon fiber, graphite fiber, vapor-phase growth carbon fiber, carbon nanofiber, and carbon nanotube. The diameter of the carbon fiber is favorably 5 nm to 200 nm and more favorably 10 nm to 100 nm. The length of the carbon fiber is favorably 100 nm to 50 μm and more favorably 1 μm to 30 μm.

As the conductive material composing the negative electrode of the lithium secondary battery of the present invention, it is preferable use the conductive carbon powder and the conductive carbon fiber in combination. As the mass mixing ratio between the conductive carbon powder and the conductive carbon fiber is preferably:

[conductive carbon powder/conductive carbon fiber= (2–8)/(1–3)].

The mixing ratio of the conductive material to the entire material composing the negative electrode is set to 1 to 12 mass % and preferably 4 to 8 mass %.

In the lithium battery using the electrode material for the lithium secondary battery, the following combination of the electrode materials is exemplified to allow the lithium secondary battery to have a high output property and a long life and in addition a compact and lightweight vehicle-mounted battery to have a high capacity effectively, which is demanded in the future is exemplified.

That is, as the positive-electrode material, it is preferable to use the Olivine-type $LiFePO_4$ which costs low, has a long life, and is safe, and has the surface of powder coated with the carbon material having the graphene phase and/or the like formed on the surfaces thereof by combining the Olivine-type $LiFePO_4$ composing the main material of the positive electrode with the conductive acetylene black and the carbon nanotube.

As the material composing the negative electrode which is the antipole, in consideration of a high capacity, a high degree of regeneration, and a long life, it is considered most favorable to form a material by coating the surface of powder of the metal silicon, the tin-including silicon or the tin oxide with the carbon material having the graphene phase and/or the like on its surface, bonding the above-described powder and the conductive carbon (acetylene black, carbon nanotube, and the like) to each other, and bonding the mixture of the powder and the conductive carbon to the graphite-based carbon material (artificial graphite or easy graphite powder) or an amorphous carbon material whose surface is coated with carbon.

A separator which can be used for the lithium secondary battery of the present invention using the electrode materials therefor holds an electrolyte by electrically insulating the positive and negative electrodes from each other. As materials for the separator, it is possible to exemplify a film made of synthetic resin, fibers, and inorganic fibers. As examples, it is possible to list films made of polyethylene, polypropylene, woven and nonwoven cloth made of these resins, glass fibers, and cellulose fibers.

As electrolytes in which the above-described group of the electrodes is immersed, it is preferable to use non-aqueous electrolytes containing lithium salts or ion conduction polymers.

As non-aqueous solvents of the non-aqueous electrolytes containing the lithium salts, ethylene carbonate (EC), propylene carbonate (PC), diethyl carbonate (DEC), dimethyl carbonate (DMC), and methyl ethyl carbonate (MEC) are listed.

As the lithium salts which can be dissolved in the non-aqueous solvents, lithium hexafluorophosphate ($LiPF_6$), lithium boron tetrafluoride ($LiBF_4$), and lithium trifluoromethanesulfonate ($LiSO_3CF_4$) are listed.

The binding agent physically and chemically stable in the atmosphere inside the battery can be used for the electrode materials of the lithium secondary battery of the present invention. Thus it is possible to use fluorine-containing resin such as polytetrafluoroethylene, vinylidene polyfluoride, and fluororubber; and thermoplastic resin such as polypropylene and polyethylene. It is also possible to use acrylic-based resin materials and styrene-butadiene-based materials.

The electrodes for the lithium secondary battery have the above-described materials and other members selected as necessary. As one of the other members, it is possible to exemplify an electricity collector for collecting electricity from the electrode materials. It is possible to exemplify a metallic thin film as the electricity collector. For example, as the electricity collector of the positive electrode, an aluminum foil is exemplified. As the electricity collector of the negative electrode, a copper foil is exemplified.

EXAMPLES

Example 1

The positive electrode of the lithium secondary battery was produced by carrying out a method shown below.

The Olivine-type lithium iron phosphate ($LiFePO_4$), having 0.5 to 2 μm in its secondary particle diameter, which was coated with the amorphous carbon material having a thickness of several nanometers was used as the active substance of the positive electrode.

10 parts by mass of a mixture of the acetylene black and the carbon nanotube (acetylene black/carbon nanotube=8/2 (mass ratio)) were added to 90 parts by mass of the active substance as the conductive material. The mixture was calcined in a reducing atmosphere at 700° C. for one hour.

Six parts by mass of vinylidene polyfluoride was added to 94 parts by mass of an obtained composite positive-electrode active substance as the binding agent. N-methylpyrrolidone was added to the mixture as a dispersion solvent. Thereafter the obtained mixture was kneaded to form a mixed agent (positive-electrode slurry) of the material composing the positive electrode.

An aluminum foil having a thickness of 20 μm and a width of 150 mm was prepared. The positive-electrode slurry was applied to both surfaces of the aluminum foil and dried. Thereafter the positive-electrode slurry was pressed and cut to obtain the positive electrode for the lithium secondary battery. When the positive-electrode slurry was pressed after it was applied to both surfaces of the aluminum foil and dried, the total thickness of the positive electrode was 160 μm.

Example 2

The negative electrode of the lithium secondary battery was produced by carrying out a method shown below.

The amorphous carbon material was applied to the surface of powder of silicon oxide including metal silicon to coat the surface of the powder in a thickness of several nanometers.

90 parts by mass of the graphite-based carbon material (soft carbon) whose surface was coated with the amorphous carbon material in a thickness of several nanometers was mixed with 10 parts by mass of the obtained powder of the silicon oxide to obtain a mixed powder. After the graphite-based carbon material was treated with a gas or a liquid containing carbon hydride, the graphite-based carbon material was calcined in the reducing atmosphere to coat the graphite-based carbon material with the amorphous carbon material in a thickness of several nanometers.

Two parts by mass of a mixture of the acetylene black and the carbon nanotube (acetylene black/carbon nanotube=1/1 (mass ratio)) were mixed with 98 parts by mass of the obtained mixed powder. A composite active substance composing the negative electrode was obtained by calcining the mixture in the reducing atmosphere at 1100° C. for one hour.

Five parts by mass of the vinylidene polyfluoride was added to 95 parts by mass of the obtained composite active substance composing the negative electrode as the binding agent. As a dispersion solvent, the N-methylpyrrolidone was added to the mixture. Thereafter the obtained mixture was kneaded to form a mixed agent (negative-electrode slurry) composing the negative electrode.

A copper foil having a thickness of 10 μm and a width of 150 mm was prepared. The negative-electrode slurry was applied to the copper foil and dried. Thereafter the negative-electrode slurry was pressed and cut to obtain the negative electrode for the lithium secondary battery. When the negative-electrode slurry was pressed after it was applied to both surfaces of the copper foil and dried, the total thickness of the negative electrode was 120 μm.

Comparative Example 1

A mixture was prepared by mixing the Olivine-type lithium iron phosphate ($LiFePO_4$) serving as the main component of the material composing the positive electrode and the acetylene black and the carbon nanotube serving as the conductive materials were used similarly to the example 1. These components were not composited, but mixed with each other at a room temperature. The obtained mixture was used as the positive-electrode plate of the comparative example 1. Other production methods were the same as those of the example 1.

Comparative Example 2

A mixture was prepared by mixing the carbon material coated with carbon serving as the main component of the material composing the negative electrode of the example 2 with the silicon oxide which was coated with carbon and included the metal silicon, and the acetylene black and the carbon nanotube both of which are conductive materials. These components were not composited, but mixed with each other at a room temperature. The obtained mixture was used as the negative-electrode plate of the comparative example 2. Polyimide was used as the binding agent at a rate of 15 parts by mass. Other production methods were the same as those of the example 2.

By combining the positive-electrode plates and the negative-electrode plates made in the examples 1 and 2 and the comparative examples 1 and 2, aluminum laminate film pack-type lithium-ion batteries were produced. A solution which contained EC and MEC mixed with each other at a volume ratio of 30:70 was prepared. Thereafter 1 mol/l of the lithium hexafluorophosphate ($LiPF_6$) was dissolved in the solution to prepared an electrolyte. As a separator interposed between the positive-electrode plate and the negative-electrode plate, a film made of PE resin and having a thickness of 20 μm was used.

By using the above-described positive and negative electrodes, four kinds of batteries having numbers 1 through 4 were made in the combinations shown in table 1. Initially the discharged capacity of each battery was measured at a voltage not more than 2.0V and a constant current of 0.5 A and 15 A. The ratio of the capacity at the current of 15 A to the capacity at the current of 0.5 A was calculated. Table 1 shows the results.

TABLE 1

Result of comparison of discharged capacity ratio at 0.5 A and 15 A

| Battery Number | Positive-electrode plate | Negative-electrode plate | Discharged capacity ratio (%) |
|---|---|---|---|
| 1 | Comparative example 1 | Comparative example 2 | 25 |
| 2 | Example 1 | Comparative example 2 | 43 |
| 3 | Comparative example 1 | Example 2 | 32 |
| 4 | Example 1 | Example 2 | 51 |

After each battery was charged at 50%, each battery was discharged at 0.1 A, 0.5 A, 1, 1.5 A, and 2.5 A for 10 seconds after the circuit was released. The voltage of each battery was measured at the elapse of 10 seconds. From an I-V characteristic straight line obtained by plotting a current value with respect to a voltage drop from an open-circuit voltage at each discharge current time, the inclination of a straight line was computed by using a least-square method. Obtained values of the batteries were compared with one another by setting the obtained values as direct current resistance values when the batteries were charged at 50%.

TABLE 2

Result of comparison of discharged DC resistance at 50% charge

| Battery Number | Positive-electrode plate | Negative-electrode plate | DC resistance (mΩ) |
|---|---|---|---|
| 1 | Comparative example 1 | Comparative example 2 | 63 |
| 2 | Example 1 | Comparative example 2 | 51 |

TABLE 2-continued

Result of comparison of discharged DC resistance at 50% charge

| Battery Number | Positive-electrode plate | Negative-electrode plate | DC resistance (mΩ) |
|---|---|---|---|
| 3 | Comparative example 1 | Example 2 | 55 |
| 4 | Example 1 | Example 2 | 41 |

By using the above-described four kinds of the batteries, a cycle life test was conducted in a charge and discharge condition where discharge (4.0 to 2.0V) at 1.5 A and charge at a constant-voltage of 4.0V (charge finished at current of 0.025 A) at a constant current of 1.5 A, suspension for 10 minutes was taken between the charge and the discharge in an atmosphere of 25° C. The life of each battery was determined by a cycle number obtained when a discharge capacity reached 70% of the initial capacity of each battery. Table 3 shows the results.

TABLE 3

Result of charge and discharghe cycle life test

| Battery Number | Positive-electrode plate | Negative-electrode plate | Cycle number when capacity reached 70% |
|---|---|---|---|
| 1 | Comparative example 1 | Comparative example 2 | 1700 |
| 2 | Example 1 | Comparative example 2 | 4500 |
| 3 | Comparative example 1 | Example 2 | 3800 |
| 4 | Example 1 | Example 2 | 8300 |

It was understood that from tables 1, 2, and 3, the battery made in combination of the positive-electrode plate of the example 1 and the negative-electrode plate of the example 2 had a low resistance, a high output and a high capacity, and a long life. Thus the battery is suitably mounted on a vehicle. Because the graphene phases and/or the like formed on the surfaces of the carbon materials overlap each other and fuse together, electronic conductivity between the electrodes is improved and maintained, and the reaction resistance of lithium ions is decreased. Thus the battery can be charged and discharged at a high by an electronic network composed of the conductive carbon material inside the electrodes. In addition, an inhibition phenomenon does not occur for the electronic network and the state of an electrode reaction. Thus the same state is maintained for a long term.

INDUSTRIAL APPLICABILITY

The electrode material for the lithium secondary battery of the present invention capable of repeating charge and discharge at a high current has a cycle performance of 5000 to 10000 cycle level for 10 years and is applicable to a battery for industrial use, for example, a battery to be mounted on a vehicle.

EXPLANATION OF REFERENCE SYMBOLS AND NUMERALS

1: oxide (Si—$SiO_2$)
2: metal silicon
3: carbon material
4: active substance coated with carbon material
5: graphite-based carbon material
6: carbon material other than graphite-based carbon material
7: composite active substance
8: graphene phase and/or the like

The invention claimed is:

1. A lithium secondary battery which repeatingly absorbs and discharges lithium ions by immersing or penetrating an organic electrolyte into a group of electrodes, said electrodes are wound or layered one upon another between a positive-electrode material in contact with a positive-electrode plate and a negative-electrode material in contact with a negative-electrode plate through an intermediary of a separator,
   wherein said negative-electrode material contains a component (a), a component (b), and a component (c), each of said components (a), (b), and (c) has at least one phase selected from among a graphene phase and an amorphous phase as a surface phase, and said negative-electrode material contains a composite negative-electrode active substance obtained by calcining in a reducing atmosphere to form a fused surface phase;
   said component (a) is at least one active substance, having an average particle diameter of 100 to 500 nm, selected from among a metal oxide containing metal and an alloy material each of which has at least one phase selected from among said graphene phase and said amorphous phase on at least a surface thereof, and said active substance is powder of tin oxide containing metallic tin or silicon dioxide powder containing metallic silicon;
   said component (b) is a graphite-based carbon material having at least one phase selected from among said graphene phase and said amorphous phase on at least a surface thereof and the mixing ratio of said component (b) to the entire material composing the negative-electrode material is set to 60 to 90 mass %; and
   said component (c) is a carbon material other than said graphite-based carbon material and has at least one phase selected from among said graphene phase and said amorphous phase on at least a surface thereof and the mixing ratio of said component (c) to the entire material composing the negative-electrode material is set to 1 to 12 mass %;
   said fused surface phase having a thickness of 1-10 nm of said components (a) and (b) comprises a carbon material obtained by treating said surface phase with a gas or a liquid containing carbon hydride to form coated components (a) and (b) and thereafter calcining said coated components (a) and (b) in a reducing atmosphere.

2. A lithium secondary battery which repeatingly absorbs and discharges lithium ions by immersing or penetrating an organic electrolyte into a group of electrodes, said electrodes are wound or layered one upon another between a positive-electrode material in contact with a positive-electrode plate and a negative-electrode material in contact with a negative-electrode plate through an intermediary of a separator,
   wherein said positive-electrode material contains a component (d) and a component (e), each of said components (d) and (e) has at least one phase selected from among a graphene phase and an amorphous phase as a surface phase, and said positive-electrode material contains a composite positive-electrode active substance obtained by calcining in a reducing atmosphere to form a fused surface phase;
   said component (d) is Olivine-type lithium metal phosphate coated with a carbon material and has at least one phase selected from among said graphene phase and said amorphous phase, having a thickness of 1-10 nm, on at least a surface thereof;

said component (e) is a carbon material other than a graphite-based carbon material and has at least one phase selected from among said graphene phase and said amorphous phase on at least a surface thereof, said fused surface phase having a thickness of 1-10 nm of said components (d) and (e) comprises a carbon material obtained by treating said surface phase with a gas or a liquid containing carbon hydride to form coated component (d) and thereafter calcining said coated component (d) in a reducing atmosphere.

3. A lithium secondary battery which repeatingly absorbs and discharges lithium ions by immersing or penetrating an organic electrolyte into a group of electrodes, said electrodes are wound or layered one upon another between a positive-electrode material in contact with a positive-electrode plate and a negative-electrode material in contact with a negative-electrode plate through an intermediary of a separator, wherein said negative-electrode material is an electrode material which contains a component (a), a component (b), and a component (c), each of said components (a), (b), and (c) has at least one phase selected from among a graphene phase and an amorphous phase as a surface phase, and said negative-electrode material contains a composite negative-electrode active substance obtained by calcining in a reducing atmosphere to form a fused surface phase;

said component (a) is at least one active substance, having an average particle diameter of 100 to 500 nm, selected from among a metal oxide containing metal and an alloy material each of which has at least one phase selected from among said graphene phase and said amorphous phase, on at least a surface thereof, and said active substance is a powder of tin oxide containing metallic tin or a powder of silicon oxide containing metallic silicon;

said component (b) is a graphite-based carbon material having at least one phase selected from among said graphene phase and said amorphous phase on at least a surface thereof and the mixing ratio of said component (b) to the entire material composing the negative-electrode material is set to 60 to 90 mass %;

said component (c) is a carbon material other than said graphite-based carbon material and has at least one phase selected from among said graphene phase and said amorphous phase on at least a surface thereof and the mixing ratio of said component (c) to the entire material composing the negative-electrode material is set to 1 to 12 mass %;

wherein said positive-electrode material contains a component (d) and a component (e), each of said components (d) and (e) has at least one phase selected from among a graphene phase and an amorphous phase as a surface phase, and said positive-electrode material contains a composite positive-electrode active substance obtained by calcining in a reducing atmosphere to form a fused surface phase;

said component (d) is Olivine-type lithium metal phosphate has at least one phase selected from among said graphene phase and said amorphous phase, on at least a surface thereof;

said component (e) is a carbon material other than a graphite-based carbon material and has at least one phase selected from among said graphene phase and said amorphous phase on at least a surface thereof, said fused surface phase having a thickness of 1-10 nm of said components (d) and (e) comprises a carbon material obtained by treating said surface phase with a gas or a liquid containing carbon hydride and thereafter forming said fused surface phase by calcining said components (d) and (e) in a reducing atmosphere.

4. A lithium secondary battery according to claim 1, wherein said graphite-based carbon material is at least one carbon material selected from among artificial graphite, natural graphite, easily graphitized carbon material and an amorphous material.

5. A lithium secondary battery according to claim 1, wherein said component (c) is at least one carbon material selected from among acetylene black, ketjen black, powder containing graphite crystal, and conductive carbon fiber.

6. A lithium secondary battery according to claim 5, wherein said conductive carbon fiber is at least one fiber selected from among carbon fiber, graphite fiber, vapor-phase growth a carbon fiber, carbon nanofiber, and carbon nanotube.

7. A lithium secondary battery according to claim 2, wherein said component (e) is at least one selected from among acetylene black, ketjen black, powder containing graphite crystal, and conductive carbon fiber.

8. A lithium secondary battery according to claim 7 wherein said conductive carbon fiber is at least one fiber selected from among carbon fiber, graphite fiber, vapor-phase growth carbon fiber, carbon nanofiber, and carbon nanotube.

9. A lithium secondary battery according to claim 3, wherein said graphite-based carbon material is at least one carbon material selected from among artificial graphite, natural graphite, easily graphitized carbon material, and an amorphous carbon material.

10. A lithium secondary battery according to claim 3, wherein said component (c) is at least one carbon material selected from among acetylene black, ketjen black, powder containing graphite crystal, and conductive carbon fiber.

11. A lithium secondary battery according to claim 10, wherein said conductive carbon fiber is at least one fiber selected from among carbon fiber, graphite fiber, vapor-phase growth carbon fiber, carbon nanofiber, and carbon nanotube.

12. A lithium secondary battery according to claim 3, wherein said component (e) is at least one carbon material selected from among acetylene black, ketjen black, powder containing graphite crystal, and conductive carbon fiber.

13. A lithium secondary battery according to claim 12, wherein said conductive carbon fiber is at least one fiber selected from among carbon fiber, graphite fiber, vapor-phase growth carbon fiber, carbon nanofiber, and carbon nanotube.

14. A lithium secondary battery according to claim 1, wherein said active substance is a powder of tin oxide containing metallic tin.

15. A lithium secondary battery according to claim 3, wherein said active substance is a powder of tin oxide containing metallic tin.

16. A lithium secondary battery according to claim 1, wherein said active substance is a powder of silicon dioxide containing metallic silicon.

17. A lithium secondary battery according to claim 3, wherein said active substance is a powder of silicon dioxide containing metallic silicon.

18. A lithium secondary battery according to claim 14 where each of said components (a), (b) and (c) have a graphene phase as the surface phase.

19. A lithium secondary battery according to claim 15, wherein each of said components (d) and (e) have a graphene phase as the surface phase.

20. A lithium secondary battery according to claim 16, wherein each of said components (d), and (e) have a graphene phase as the surface phase.

21. A lithium secondary battery according to claim 17, wherein each of said components (d) and (e) have a graphene phase as the surface phase.

22. A lithium secondary battery according to claim 2, wherein each of said components (d) and (e) have a graphene phase as the surface phase.

* * * * *